United States Patent [19]

Osaka et al.

[11] Patent Number: 5,055,442
[45] Date of Patent: Oct. 8, 1991

[54] CARRIER FOR CATALYST AND METHOD FOR PRODUCTION THEREOF

[75] Inventors: Shigemi Osaka; Kazuo Hata; Tsukasa Takashashi, all of Himeji, Japan

[73] Assignee: Nippon Shokubai Kagaku Kogyo Co., Ltd., Osaka, Japan

[21] Appl. No.: 480,961

[22] Filed: Feb. 16, 1990

[30] Foreign Application Priority Data

Feb. 17, 1989 [JP] Japan .................................. 1-36243

[51] Int. Cl.$^5$ ............................................ B01J 32/00
[52] U.S. Cl. ................................................... 502/439
[58] Field of Search ........................ 502/527, 439, 349

[56] References Cited

U.S. PATENT DOCUMENTS

| | | | |
|---|---|---|---|
| 3,900,306 | 8/1975 | Brueggemann et al. | 502/527 X |
| 3,972,834 | 8/1976 | Washbourne | 502/439 X |
| 4,279,782 | 7/1981 | Chapman et al. | 502/527 X |
| 4,315,839 | 2/1982 | Bouge et al. | 502/439 X |
| 4,362,651 | 12/1982 | Schwarzenbek | 502/527 X |
| 4,392,987 | 7/1983 | Laine et al. | 502/439 |
| 4,499,194 | 2/1985 | Harada et al. | 502/439 X |
| 4,542,113 | 9/1985 | Meyer et al. | 502/439 X |
| 4,554,268 | 11/1985 | Neel et al. | 502/439 |
| 4,585,752 | 4/1986 | Ernest | 502/439 X |
| 4,631,269 | 12/1986 | Lachman et al. | 502/439 |
| 4,731,234 | 3/1988 | Wada et al. | 502/349 X |
| 4,766,101 | 8/1988 | Nortier et al. | 502/439 X |
| 4,778,779 | 10/1988 | Murrell et al. | 502/439 X |
| 4,783,436 | 11/1988 | Brandis et al. | 502/527 X |

FOREIGN PATENT DOCUMENTS

| | | | |
|---|---|---|---|
| 0264250 | 12/1965 | Australia | 502/439 |
| 0293859 | 12/1988 | European Pat. Off. | 502/247 |
| 54-20983 | 2/1979 | Japan | 502/527 |
| 56-37052 | 4/1981 | Japan . | |
| 56-93849 | 7/1981 | Japan | 502/439 |
| 1223001 | 2/1971 | United Kingdom | 502/527 |
| 1537839 | 1/1979 | United Kingdom . | |
| 2037342 | 7/1980 | United Kingdom | 502/527 |

OTHER PUBLICATIONS

Patent Abstract of Japan, vol. 5, No. 94 (C-59)[776], Jun. 19, 1981.

*Primary Examiner*—W. J. Shine
*Assistant Examiner*—D. J. McGinty
*Attorney, Agent, or Firm*—Burns, Doane, Swecker & Mathis

[57] ABSTRACT

A carrier for catalyst using refractory particles as cores and having a refractory inorganic powder and optionally whiskers, inorganic oxide sols, or mixtures thereof deposited on the cores, and a method for the production thereof.

33 Claims, No Drawings

CARRIER FOR CATALYST AND METHOD FOR PRODUCTION THEREOF

BACKGROUND OF THE INVENTION

1. Field of the Invention

This invention relates to a carrier for catalyst and to a method for the production thereof. More particularly, it relates to a method for the production of a carrier for catalyst, which method allows the surface area, pore diameter, and pore volume of the carrier for catalyst, the distributions of magnitudes of these properties, the acidity and basicity of the carrier, and the distributions of magnitudes of these properties to be freely designed to suit variety of reactions for which the catalyst on the produced carrier is intended and to a carrier for catalyst possessing a novel structure.

2. Description of the Prior Art

Porous inorganic carriers have been heretofore produced by preparing as aggregates particulates of a variety of metal oxides such as alumina, silica, titania and zirconia or of refractory materials such as silicon carbide and silicone nitrate, mixing the aggregate with a binding agent comprising a clayish substance as a main component, molding the resultant mixture by pelletization and calcining the molded mixture.

The carriers are produced to provide physical properties such as surface area, pore diameter, and their distributions, which are required for the fulfillment of their role as carrier, for various kind of reactions.

The carrier thus obtained has been finding extensive utility in commercial applications. The catalysts incorporating the carrier of this kind are generally used at relatively high temperatures. During the course of a reaction, the components of the binding agent migrate from the carrier layer to the catalyst layer. These migrating components gradually affect the catalytic activity and selectivity of the catalyst. An alkali metal is used as an additive component of the binding agent, particularly for the purpose of lowering the calcination temperature during the course of production of the carrier. Alkali metals such as sodium, potassium are readily migrating substances. Even when the alkali metal is incorporated only in a minute amount, it produces a serious effect on the quality of the catalyst to be produced. For fear of this adverse effect, it is necessary to produce a highly pure carrier avoiding the use of the binding agent which may well be called an impurity. For example, a method which uses a sol or a salt of the same metal as adopted for aggregate is used as a substitute for the binding agent and a method which resorts to the same treatments of reaction and sintering as in the case of SiC have been known in the art. By reason of restrictions imposed on the process of production, however, the carriers of this class are allowed only narrow ranges for variation of their physical properties and produced carriers are deficient in functionality.

An object of the present invention, therefore, is to provide a novel carrier for catalyst and a method for the production thereof.

Another object of this invention is to provide a carrier without the binding agent of the nature described above and easily permits generous adjustment of physical properties of catalyst to suit a varying reaction for which a catalyst using the carrier is intended.

Still another object of this invention is to provide a method for the production of a carrier, which can be easily carried out more economically.

SUMMARY OF THE INVENTION

These objects described above are accomplished by a carrier for catalyst using refractory inorganic particles as cores and having a refractory inorganic powder deposited on the cores.

These objects are accomplished by a carrier for catalyst using refractory inorganic particles as cores and having a refractory inorganic powder and whiskers deposited on the cores.

These objects are accomplished by a carrier for catalyst using refractory inorganic particles as cores and having a refractory inorganic powder and inorganic oxide sols deposited on the cores.

These objects are accomplished by a carrier for catalyst using refractory inorganic particles as cores and having a refractory inorganic powder, whiskers, and inorganic oxide sols deposited on the cores.

These objects are accomplished by a method for the production of a carrier for catalyst using refractory inorganic particles as cores and having a refractory inorganic powder deposited on the cores, which method comprises applying a slurry of the refractory inorganic powder to the refractory inorganic particles and drying the resultant wet refractory inorganic particles.

These objects are accomplished by a method for the production of a carrier for catalyst using refractory inorganic particles as cores and having a refractory inorganic powder and whiskers deposited on the cores, which method comprises applying a mixed slurry of the refractory inorganic powder and whiskers to the refractory inorganic particles and drying the resultant wet refractory inorganic particles.

These objects are accomplished by a method for the production of a carrier for catalyst using refractory inorganic particles as cores and having a refractory inorganic powder and inorganic oxide sol deposited on the ores, which method comprises applying a mixed slurry of the refractory inorganic powder and the inorganic oxide sol to the refractory inorganic particles and drying the resultant wet refractory inorganic particles.

These objects are accomplished by a method for the production of a carrier for catalyst using refractory inorganic particles as cores and having a refractory inorganic powder, whiskers, and inorganic oxide sol deposited on the cores, which method comprises applying a mixed slurry of the refractory inorganic powder, the whiskers, and the inorganic oxide sol to the refractory inorganic particles and drying the resultant wet refractory inorganic particles.

This invention allows the various properties of a carrier for catalyst such as the surface area, pore diameter, and pore volume, the distributions of magnitudes of these properties, the acidity and basicity, and the distributions of magnitudes of these properties to be freely designed. It, therefore, manifests an outstanding effect of providing a catalyst which permits control of a sequential reaction, control of thermal conductivity, and control of carrier strength and fits a varying reaction for which the catalyst is intended.

DESCRIPTION OF THE PREFERRED EMBODIMENT

Now, the invention will be described more specifically below.

In the present invention, the carrier is produced by depositing a refractory inorganic powder as aggregate on refractory inorganic particles destined to form cores and then optionally subjecting the powdered refractory inorganic particles to a heat treatment. The particles destined to form cores, therefore, are used simply for the purpose of molding the aggregate powder in the form of a carrier The powder in itself is not required to possess any functionality as carrier. The substances which are usable for cores include metal oxides such as alumina, zirconia, titania, and silica, composite oxides such as mullite, cordierite, and zircon, and non-oxides such as silicon carbide and silicon nitride, for example. There can be used a sintered article which is obtained by calcining a particulate substance, excluding any clayish binding agent; a sintered article which is obtained from the particulate substance with a similar metal oxide sol or metal salt as a sintering auxiliary; or a product which is obtained by fusing the particulate substance. The shape of these particles is not particularly critical. The particles may possess any of such shapes as amorphous mass, spheres, cylinders, circular columns, Raschig rings, and Berl saddles. They are preferable, however, to possess a shape of high rollability enough for the aggregate powder to be deposited thereon in uniform thickness. The size of the particles as cores is suitably selected so that the representative diameters of the particles fall in the range of 0.3 to 12 mm, preferably 1 to 8 mm.

The selection of a substance for the aggregate powder is important because this substance determines the functionality as carrier, i.e. such physical and chemical properties as surface area, pore diameter, pore volume, acidity, and basicity. These properties affect the activity, selectivity, and durability of catalyst in a large measure. The carrier, therefore, must be designed so as to suit best the reaction for which the catalyst using the carrier is intended.

The substances which are usable as aggregate herein include metal oxides such as alumina, titania, zirconia, magnesia, and silica, non-oxides such as silicon carbide, silicon nitride, and aluminum nitride, and composite oxides such as alumina-silica, alumina-titania, titania-silica, titania-zirconia, cordierite, mullite, and zircon. A powder made of the substance or a mixture of two or more substances selected from the group of substances mentioned above is used.

For the aggregate powder of such a substance to be put to use, the properties of the powder such as surface area, pore diameter, distribution of pore diameters, acidity and basicity, and distribution of magnitudes thereof are adjusted so as to suit the physical properties required of carrier. A carrier having at least two peaks in the pore diameter distribution of carrier, for example, can be produced by using at least two masses of powder possessing different pore diameters and mixed in a desired ratio.

The particles making up the aggregate powder are generally amorphous in form. By restricting the shape of these particles to spheres, scales, or strips, for example, such physical properties of carrier as pore diameter and pore volume can be controlled with higher accuracy. The particles of the aggregate powder have an average diameter in the range of 0.05 to 1,200 $\mu$m, preferably 0.1 to 500 $\mu$m.

The powder is then deposited on the core particles. When the powder is not easily deposited on the core particles and the yield of deposition is low or when the powder is deposited weakly on the core particles, it is preferable to use whiskers as a deposition auxiliary. Though inorganic fibers such as glass fibers are usable as a material for enhancing the strength of deposition, it has been demonstrated that the deposition auxiliary in the form of whiskers is most preferable where the carrier is produced by the method of the present invention which will be described more specifically hereinbelow. The use of such whiskers is conspicuously effective in improving the yield of deposition and the strength of deposition. Since the whiskers are refractory, they constitute themselves an additive component of the carrier and manifest an effect of regulating the physical properties of the carrier.

The whiskers to be used in the present invention are produced by the known method. The substances which are usable for the production of the whiskers include metals such as tungsten, iron, and nickel and inorganic compounds such as silicon carbide, silicon nitride, aluminum oxide, titanium dioxide, beryllium oxide, boron carbide, titanium carbide, potassium titanate, and calcium phosphate, for example.

The shape of the whiskers to be used in this invention is preferable to be such that the average diameter is in the range of 0.1 to 5 $\mu$m, preferably 0.3 to 1 $\mu$m, the length in the range of 5 to 1,000 $\mu$m, preferably 10 to 500 $\mu$m, and the aspect ratio in the range of 10 to 500.

The amount of the whiskers to be used is in the range of 1 to 50% by weight, preferably 1 to 20 % by weight, based on the amount of the aggregate substance. The whiskers used in this amount manifest an effect in enhancing the yield of deposition and the strength of deposition of the aggregate substance.

The refractory inorganic powder or the mixture of this refractory inorganic powder with whiskers may incorporate therein inorganic oxide sol. Owing to the use of these whiskers, a carrier possessing practically sufficient strength can be easily produced. When a catalyst is to be prepared by using this carrier as when the catalyst is required to be prepared by vigorously stirring the carrier, it may be necessary at times to minimize the amount of component substances of the carrier, which passes into the active component of the catalyst. In this case, better results are obtained by additionally using inorganic oxide sol optionally in combination with the whiskers. The amount of this inorganic oxide sol to be used is in the range 0.5 to 20 % by weight, preferably 1 to 10 % by weight, calculated as an oxide, based on the amount of the aggregate substance. The inorganic oxide sol may be added either to the slurry of the powder and the whiskers or to the carrier already molded. More often than not, the inorganic oxide sol is transformed into gel of increased viscosity when it is mixed with some substance or exposed to heat. The inorganic oxide sol to be used in this invention, therefore, is preferable to possess high stability.

Our diligent study in search of a method for the preparation of sol has revealed that zirconia sol of the type described below possesses high stability and suits the production of the carrier aimed at by this invention.

The zirconia sol suitable for this invention is prepared by mixing an aqueous zirconyl ammonium carbonate solution with a chelating agent thereby converting the zirconyl ammonium carbonate into a zirconium chelate compound, then thermally hydrolyzing the chelate compound, optionally passing the hydrolyzate through an ultrafiltration membrane, and washing the residue on the membrane. The aqeuous zirconyl ammonium carbonate solution used in this method is commercially available. The zirconyl ammonium carbonate is hydrolyzed with evolution of such gases as ammonia and carbon dioxide into hydrated zirconia. The resultant reaction solution possesses an alkaline pH and exhibits the nature of sol. When the reaction is continued, however, the reaction solution gains in viscosity and undergoes conversion into gel within a relatively short span of time. Thus, the hydrolysis is effected only in a small amount of the zirconyl ammonium carbonate. For stable continuation of the hydrolysis of zirconyl ammonium carbonate, we have developed a method for obtaining zirconia sol by mixing an aqueous zirconyl ammonium carbonate solution with a chelating agent thereby preparing a reaction product of zirconyl ammonium carbonate with the chelating agent, and then heating the aqueous solution containing the reaction product to a temperature exceeding 60° C. thereby hydrolyzing the reaction product.

Specifically, when the aqueous zirconyl ammonium carbonate solution is placed in a stirring tank-type reactor and then the chelating agent is added as kept in a stirred state to the aqueous solution, the zirconyl ammonium carbonate promptly reacts with the chelating agent at room temperature.

When the reaction solution obtained at the end of the reaction is heated to a temperature exceeding 60° C., the reaction product of zirconyl ammonium carbonate with the chelating agent undergoes hydrolysis with evolution of a gas comprising mainly carbon dioxide and ammonia. The reaction solution provides no increase in viscosity during the course of this hydrolysis and maintains clarity until completion of the hydrolysis. The reaction solution possesses a nearly neutral pH value. During the course of this reaction, such impurity ions as ammonium ion and carbonic acid ion are discharged as sol in the form of ammonia and carbon dioxide from the reaction system. The reaction solution, therefore, can be used advantageously in its unwashed state as zirconia sol.

The unaltered reactants and carbonic acid ion and ammonium ion which remain in very minute amounts in the reaction solution can be efficiently and rapidly separated and cleaned by the use of an ultrafiltration membrane. The zirconia sol of high purity and high concentration can be obtained by further heating and concentrating the reaction solution with the ultrafiltration membrane.

The chelating agents which are usable in this invention include oxyphenol such as catechol and pyrogallol; aminoalcohols such as diethanolamine and triethanolamine; oxy acids such as glycolic acid, citric acid, tartaric acid, lactic acid, mandelic acid, malic acid, and hydroxyacrylic acid, and methyl, ethyl, and hydroxyethyl esters of such oxy acids; oxyaldehydes such as glycol aldehyde; polycarboxylic acids such as oxalic acid, malonic acid; amino acids such as glycine and alanine: and $\beta$-diketones such as acetyl ketone acetyl acetone, benzoyl acetone, stearoyl acetone, stearoyl benzoyl methane, and dibenzoyl methane, $\beta$-ketonic acids such as acetoacetic acid, propionyl acetic acid, and benzoyl acetic acid, and methyl, ethyl, n-propyl, isopropyl, n-butyl, and t-butyl esters thereof. These chelating agents may be used either singly or in the form of a mixture of two or more members. Among other chelating agents mentioned above, oxy acids such as glycolic acid, citric acid, tartaric acid, lactic acid, mandelic acid, malic acid, and hydroxyacrylic acid and $\beta$-diketones such as acetyl acetone prove to be preferably usable. Still more preferable are $\alpha$, $\beta$, and $\gamma$-oxy acids, specifically, $\alpha$-, $\beta$-, and $\gamma$-ketonic acids possessing a functional group having oxygen atoms on the $\alpha$-, $\beta$-, and $\gamma$- carbon atoms and esters thereof.

Though the amount of the chelating agent to be used is variable with the particular kind of chelating agent, it is desired to be such that the chelating agent (number of mols)/zirconia (number of mol) ratio falls in the range of 0.02/1 to 4/1, preferably 0.1/1 to 3/1, and more preferably 0.5/1 to 2/1.

If the reaction of zirconyl ammonium carbonate with the chelating agent is carried out in a condition that the amount of the chelating agent is too small, a certain king of organic zirconium salt, on hydrolyzing by the method of the present invention, exhibits the same behavior as that of zirconium ammonium carbonate alone, and the hydrolysis does not continue. Conversely, if this amount is such that the ratio exceeds 4/1, the excess is wasted without bringing about any special effect.

For the hydrolysis of this invention, a reaction temperature exceeding 60° C. suffices. For the purpose of accelerating the reaction, this reaction may be desirably carried out under increased pressure. Practically, the reaction temperature is in the range of 60° to 300° C. The concentration of zirconyl ammonium carbonate is not particularly critical. Though the economical advantage of production increases with the increasing concentration of zirconyl ammonium carbonate, the concentration of zirconyl ammonium carbonate in its aqueous solution is desired to be in the range of 10 to 25% by weight as $ZrO_2$ in due consideration of the stability of the solution during the course of standing.

Since the zirconia sol thus obtained is stabilized with the chelating agent, it exhibits high stability in a wide pH range, retains this stability even in the presence of an alkaline substance, allows refinement up to a concentration of 45% by weight as $ZrO_2$ with low viscosity, enjoys transparency of appearance and fineness of sol, and manifests high strength when used as an inorganic binder as contemplated by this invention.

For the deposition of the aggregate powder on the core particles, the method described below is adopted.

By the use of a homogenizer, for example, the powder of regulated particle size alone or the powder and the whiskers and/or the inorganic oxide sols are stirred in a solvent for thorough mixture. In this case, the dispersibility of the aggregate powder and the whiskers and/or the inorganic oxide sol can be effectively improved by addition of a dispersant and a surfactant in a small amount. The slurry obtained in consequence of the stirring is then heated to a temperature in the range of 50° to 500° C., preferably 100° to 400° C. and sprayed on core particles which are kept stirred and fluidized in the meantime, so that the solvent is expelled by evaporation and the solute is deposited on the core particles. Alternatively, the core particles are immersed in the slurry, then heated, and finally dried. The slurry concentration is adjusted in the range of 3 to 60% by weight, preferably 10 to 40 % by weight. If the slurry concentration is unduly low, the deposition consumes much time and proves to be economically disadvantageous. If the concentration is unduly high, the slurry is too viscous to be sprayed.

The deposition can be otherwise attained readily by the use of a centrifugal flow coating device. That is, it resorts to a method which comprises quantitatively spraying a coating solution on the core particles held in a fluidized state and, at the same time, quantitatively spraying thereof the aggregate powder optionally mixed uniformly with the whiskers in the centrifugal flow coating device to obtain spheroidal carrier of regulated particle size. Air and the like is introduced into the device to aid in drying and effect deposition. This deposition, when necessary, may be effected relatively rapidly by using heated air and the like. The strength of deposition can be effectively increased by adding, if necessary, an inorganic oxide sol and then adding an acrylic organic binder dissolved in advance in the coating solution. The procedure of application and the subsequent desiccation, when necessary, may be repeated several times.

The amount of the aggregate powder to be deposited is in the range of 1 to 500 g, preferably 20 to 200 g, based on 100 ml of the core particles no matter which method may be used. Precisely, this amount is determined mainly by the pore volume, specific surface area, etc. required of the carrier.

The deposition-type carrier obtained as described above exhibits ample strength of deposition even in its unmodified state and can be put to use as a carrier. For further improvement of the strength of deposition, this carrier is desired to be subjected to a heat treatment which is capable of decomposing and removing entrained organic substances. This heat treatment is carried out at a temperature in the range of 200° to 1,600° C., preferably 400 to 1,200 ° C. for a period in the range of 0.5 to 5 hours. The carrier which has undergone this heat treatment possesses practically sufficient strength. By the method of this invention, carriers can be provided with various physical constants being controlled as desired, e.g., low-surface area type carriers used chiefly for catalytic gaseous-phase partial oxidation, high-surface area type carriers used for catalytic gaseous-phase complete oxidation and the like.

The preparation of a catalyst by the use of the carrier of this invention can be effected by any of the known methods employed in the preparation using the conventional carrier. Among other known methods, the so-called immersion method proves to be particularly preferable for the preparation of the catalyst under discussion. The carrier is immersed in a solvent containing a catalytically active component. The wet carrier is dried and then transformed by thermal decomposition and activation into a catalyst. When the carrier has poor affinity for the catalytic component solution or the amount of deposition is small, there may be employed a method which comprises immersing the carrier in the catalyst component solution, stirring the solution thereby expelling the solvent, and consequently allowing the catalytic component to be deposited on the carrier or keeping the carrier at all times in a dry state and, at the same time, spraying the catalytic component solution on the dry carrier.

The carrier of this invention which is obtained as described above is a porous inorganic carrier advantageously used in a catalyst which has a metal and/or a metal oxide deposited as dispersed therein and is used in various gas phase catalytic reactions. The reaction for which the catalyst is used is not particularly limited.

The catalysts for which the carrier of this invention is usable include a catalyst prepared with silver as a main catalytic substance and used for the production of ethylene oxide by the gas phase oxidation of ethylene, a catalyst prepared chiefly with at least one metal selected from among iron, nickel, zinc, and copper and used for gas phase reductions such as the reaction for synthesis of ammonia, the reaction for production of water gas, and the reaction for synthesis of methanol, a catalyst prepared with such an expensive noble metal as platinum, palladium, or gold, and a catalyst prepared mainly with such a catalytic substance as chromium or manganese and used for the production of benzaldehyde by the hydrogenation of benzoic acid, for example.

Now, this invention will be described more specifically below with reference to working examples.

EXAMPLE 1

An aqueous solution having 0.2 mol of zirconium oxychloride dissolved in 1 liter of purified water was prepared. In an overflow tube-fitted stirring type reactor, 1.2 liters of purified water was placed and adjusted to pH 8.0 by addition of aqua ammonia. To the reactor containing the pH-adjusted purified water, the aqueous solution mentioned above was added at a flow rate of 190 ml per minute and aqua ammonia (aqueous 28 wt% solution) was poured in with a metering pump at a flow rate of 200 ml per hour, both in a stirred state. The ensuant neutralization reaction was continuously carried out with the reaction solution left flowing out through the overflow tube and the amount of the solution in the reactor kept substantially constant. The neutralization reaction was continued with the flow rate of the aqua ammonia finely adjusted so as to keep the pH value of the solution within $8 \pm 0.2$ throughout the entire course of the reaction. The hydroxide in the effluent from the reactor was separated by filtration from the mother liquid and then washed with water to expel ammonium chloride. The hydroxide consequently obtained was dehydrated by dispersing the hydroxide in 1-propanol and heating the resultant dispersion thereby causing the water in the system to be expelled in the form of a mixture with 1-propanol. By drying the dehydrated hydroxide and calcining the resultant powder at 700° C. for one hour, there was obtained a fine zirconia powder having a specific surface area of 32 m$^2$/g.

A homogeneous slurry was obtained by stirring 500 g of the fine zirconia powder obtained as described above and 800 ml of purified water with a ball mill.

In an externally heating type rotary furnace, 300 ml of self-sintered porous spherical particles of SiC having an average particle diameter of 1.5 mm were placed and kept heated at 250° to 300° C. and, at the same time, the slurry mentioned above was sprayed on the core particles until 250 g of zirconia was deposited as an aggregate substance on the core particles. By calcining the resultant carrier at 900° C., there was obtained a deposition type zirconia carrier having an average pore diameter of 0.1 μm, a specific surface area of 3 m$^2$/g, and a pore volume of 0.15 ml/g and exhibiting high strength.

EXAMPLE 2

An α-alumina powder having a specific surface area of 8 m$^2$/g was prepared by mixing masses of α-alumina possessing different particle diameters. In the particle diameter distribution of this alumina powder, the particles measuring not more than 0.5 μm accounted for 50% by weight, those measuring between 0.5 and 2 μm for 35% by weight, and those measuring not less than 2 μm for 15% by weight. In a homogenizer, 1 kg of this powder, 50 g of SiC whiskers, and 600 ml of purified water were stirred for uniform mixture. The whiskers measured 0.6 μm in average diameter and 15 μm in average length.

In an externally heating type rotary furnace, 300 ml of self-sintered porous spherical particles of SiC having an average particle diameter of 1.5 mm were placed and kept heated at 250° to 300° C. and, at the same time, the slurry mentioned above was sprayed on the core particles until 350 g of alumina was deposited as an aggregate substance. By calcining the resultant carrier at 1,400° C., there was obtained a deposition type alumina carrier possessing an average pore diameter of 0.15 μm, a specific surface area of 2 m$^2$/g, and a pore volume of 0.25 ml/g and exhibiting high strength.

EXAMPLE 3

To a solution which was prepared by dissolving 180 g of a surfactant formed of a sorbitan fatty acid ester and possessing HLB (hydrophilic-lipophilic balance) of about 6 in 15 liters of n-octanol, 10 liters of zirconia sol having a concentration of 10% by volume was added with stirring by the use of a homogenizer. The premixed solution was further stirred for one hour in a colloid mill, to prepare a W/O (water in oil) type sol emulsion. Then, this W/O type sol emulsion was gelled by blowing 100% ammonia gas at a flow rate of 250 ml/minute for about two hours into the sol emulsion. Then, in a vacuum drier, the resultant gel emulsion was kept stirred and evaporated to dryness to expel water and n-octanol from the reaction system. The minute spherical particles consequently obtained were fired at 600° C. for 2 hours, to obtain highly dispersible minute spherical zirconia particles having an average particle diameter of 0.4 μm.

In methanol, 800 g of the minute spherical zirconia particles obtained as described above and 25 g of SiC whiskers were uniformly mixed. The resultant mixture was dried and then disintegrated by the use of a jet mill, to obtain an aggregate substance powder.

In a coating pelletizer, 400 ml of self-sintered porous spherical particles of SiC having an average particle diameter of 1.5 mm were placed and kept fluidized and mixed and, at the same time, purified water as a coating liquid and the aforementioned aggregate substance powder were simultaneously sprayed quantitatively onto the core particles to effect continuous deposition in a coating tank while flowing hot air to the depositing portions to dry. As the result, 100 g of the minute spherical zirconia particles were deposited as aggregate substance per 100 ml of the core particles. Then, by calcining the coated core particles at 1,000° C., there was obtained a deposition type zirconia carrier possessing an average pore diameter of 0.2 μm, a specific surface area of 1 m$^2$/g, and a pore volume of 0.1 ml/g and exhibiting high strength.

EXAMPLE 4

A commercially available, aqueous zironyl ammonium carbonate solution (1.300 g) having a 13% by weight of ZrO$_2$ was placed on a flask having an inner volume of 2 liters. The aqueous solution was kept stirred and 10.4 g of glycolic acid was gradually added thereto. During this addition of the acid, the reaction mixture liberated an odorless gas. Then, the flask containing the reaction mixture was heated by the use of a mantle heater to induce hydrolysis of the reaction mixture. As the temperature of the sol rose, the hydrolysis of the sol proceeded with vigorous effervescence and liberation of such gases as ammonia and carbon dioxide originating in unnecessary ions present in the sol. After the reaction lasted at a temperature of about 100° C. for about three hours and the effervescence subsided, the heating was continued further for 12 hours with the reaction mixture properly replenished with purified water. Consequently, there was obtained zirconia sol possessing a concentration of 25% by weight as ZrO$_2$ and exhibiting a pH value of 7.

In 500 ml of the sol, 200 g of the carrier obtained at the end of the step of firing in Example 3 was boiled for one hour. Under the impact of this boiling, the air entrapped in the carrier was displaced with the sol until the sol permeated to the carrier interior. The treated carrier was then removed from the sol to blow off excess sol therefrom, and calcined at 800° C. for one hour.

The carrier thus produced was found to manifest notably improved wear resistance owing to a layer of the aggregate substance attached fast thereto by the aid of zirconia from the sol.

EXAMPLE 5

A fine zirconia powder having a specific surface area of 23 m$^2$/g was obtained by calcining the zirconia powder of a specific surface area of 32 m$^2$/g obtained by the procedure of Example 1 at 800° C. for one hour. In a ball mill, 500 g of this fine zirconia powder was stirred with 600 g of purified water and 100 g of zirconia obtained in Example 4 to produce a homogeneous slurry.

In an externally heating type rotary furnace, 300 ml of self-sintered porous spherical particles of SiC having an average particle diameter of 1.5 mm were placed and kept heated at 150° to 200° C. and, at the same time, the slurry mentioned above was sprayed on the core particles until 300 g of zirconia was deposited as aggregate substance on the core particles. When the carrier obtained at the end of the deposition was fired at 600° C., there was produced a deposition type zirconia carrier possessing an average pore diameter of 0.15 μm, a specific surface area of 4 m$^2$/g, and a pore volume of 0.2 ml/g and exhibiting high strength.

EXAMPLE 6

An eggplant-shaped flask containing 100 cc of the zirconia carrier obtained in Example 5 and 200 cc of a mixed solution of chromium nitrate and manganese nitrate was set in place in a rotary evaporator. The flask was continuously evacuated and heated at 70° to 80° C. to induce impregnation of the zirconia carrier with chromium nitrate and manganese nitrate. The impregnated zirconia carrier was dried and then heat-treated in a cylindrical electric furnace under a current of nitrogen gas at 600° C. for 10 hours, to obtain a composition having chromium deposited thereon in a ratio of 5 g/liter and manganese in a ratio of 2 g/liter.

This composition was packed in a normal-pressure gas-flow type reactor and used as a catalyst for the synthesis of benzaldehyde by the hydrogenation of benzoic acid. The hydrogenation was carried out at a catalyst temperature of 320° C. under normal pressure at a space velocity of hydrogen at 1,500 hr$^{-1}$, with a benzoic acid concentration at 2%. It produced benzaldehyde in a yield of 98%.

EXAMPLE 7

A composition having platinum deposited thereon in a ratio of 1 g/liter was obtained by following the procedure of Example 6, using an eggplant-shaped flask containing 100 cc of the alumina carrier obtained in Example 2 and 200 cc of an aqueous platinum chloride solution. The heat treatment for firing was carried out in an atmosphere of air at 600° C. for three hours.

This composition was packed in a gas-flowing type reactor and tested for CO combustion capacity, with a gas containing 500 ppm of carbon monoxide (air balance) used as a reaction gas (supplied at a space velocity of 10,000 hr$^{-1}$) and the gas temperature at the catalyst inlet kept at 300° C.

Then, the same catalyst was left aging under a current of air at 900° C. for 24 hours and tested again for the same capacity. The CO conversion with the fresh catalyst was 97% and the CO coversion with the catalyst after the aging was 88%.

What is claimed is:

1. A carrier for catalyst comprising refractory inorganic particles as cores and having a refractory inorganic powder deposited on said cores, wherein the amount of said refractory inorganic powder is in the range of 1 to 500 g, based on 100 ml of said refractory inorganic particles, and said refractory inorganic particles possess particle diameters in the range of 0.3 to 12 mm and said refractory inorganic powder possesses an average particle diameter in the range of 0.05 to 1,200 μm.

2. A carrier according to claim 1, wherein said refractory inorganic particles and said powder are formed of at least one member substance selected from the group consisting of metal oxides, composite metal oxides, and non-oxides.

3. A carrier for catalyst comprising refractory inorganic particles as cores and having a refractory inorganic powder and whiskers deposited on the cores.

4. A carrier according to claim 3, wherein the amount of said refractory inorganic powder is in the range of 1 to 500 g, based on 100 ml of said refractory inorganic particles and the amount of said whiskers is in the range of 1 to 50% by weight, based on the amount of said refractory inorganic powder.

5. A carrier according to claim 4, wherein said refractory inorganic particles possess particle diameters in the range of 0.3 to 12 mm and said refractory inorganic powder possesses an average particle diameter in the range of 0.05 to 1,200 μm and said whiskers possess an average diameter in the range of 0.1 to 5 μm and a length in the range of 5 to 1,000 μm.

6. A carrier according to claim 5, wherein said refractory inorganic particles and said powder are formed of at least one member substance selected from the group consisting of metal oxides, composite metal oxides, and non-oxides.

7. A carrier for catalyst using refractory inorganic particles as cores and having a refractory inorganic powder and inorganic oxide sols deposited on said cores.

8. A carrier according to claim 7, wherein the amount of said refractory inorganic powder is in the range of 1 to 500 g, based on 100 ml of said refractory inorganic particles and the amount of said inorganic oxide sol is in the range of 0.5 to 20 % by weight calculated as an oxide, based on the amount of said refractory inorganic powder.

9. A carrier according to claim 8, wherein said refractory inorganic particles possess particle diameters in the range of 0.3 to 12 mm and said refractory inorganic powder possesses an average particle diameter in the range of 0.05 to 1,200 μm.

10. A carrier according to claim 9, wherein said refractory inorganic particles and said powder are formed of at least one ceramic substance selected from the group consisting of metal oxides, composite metal oxides, and non-oxides.

11. A carrier according to claim 8, wherein said inorganic oxide sol is zirconia sol.

12. A carrier for catalyst comprising refractory inorganic particles as cores and having a refractory inorganic powder, whiskers, and inorganic oxide sol deposited on said cores.

13. A carrier according to claim 12, wherein the amount of said refractory inorganic powder is in the range of 1 to 500 g, based on 100 ml of said refractory inorganic particles and the amount of said whiskers is in the range of 1 to 50% by weight and the amount of said inorganic oxide sol is in the range of 0.5 to 20 % by weight calculated as an oxide, based on the amount of said refractory inorganic powder.

14. A carrier according to claim 13, wherein said refractory inorganic particles possess particle diameters in the range of 0.3 to 12 mm and said refractory inorganic powder possesses an average particle diameter in the range of 0.05 to 1,200 μm and said whiskers possess an average diameter in the range of 0.1 to 5 μm and a length in the range of 5 to 1,000 μm.

15. A carrier according to claim 14, wherein said refractory inorganic particles and said powder are formed of at least one member substance selected from the group consisting of metal oxides, composite metal oxides, and non-oxides.

16. A carrier according to claim 13, wherein said inorganic oxide sol is zirconia sol.

17. A method for the production of a carrier for catalyst comprising refractory inorganic particles as cores and having a refractory inorganic powder deposited on the cores, which method comprises applying a slurry of the refractory inorganic powder to the refractory inorganic particles and drying the resultant wet refractory inorganic particles; wherein the amount of said refractory inorganic powder is in the range of 1 to 500 g, based on 100 ml of said refractory inorganic particles and said refractory inorganic particles possess particle diameters in the range of 0.3 to 12 mm and said refractory inorganic powder possesses an average particle diameter in the range of 0.05 to 1,200 μm.

18. A method according to claim 17, wherein after the drying an inorganic oxide sol is further applied to said carrier.

19. A method according to claim 17, wherein said carrier is further calcined.

20. A method for the production of a carrier for catalyst using refractory inorganic particles as cores and having a refractory inorganic powder and whiskers deposited on the cores, which method comprises applying a mixed slurry of the refractory inorganic powder and whiskers to the refractory inorganic particles and drying the resultant wet refractory inorganic particles.

21. A method according to claim 20, wherein the amount of said refractory inorganic powder is in the range of 1 to 500 g, based on 100 ml of said refractory inorganic particles and the amount of said whiskers is in the range of 1 to 50% by weight, based on the amount of said refractory inorganic powder.

22. A method according to claim 21, wherein said refractory inorganic particles possess particle diameters in the range of 0.3 to 12 mm and said refractory inorganic powder possesses an average particle diameter in the range of 0.05 to 1,200 μm and said whiskers possess an average diameter in the range of 0.1 to 5 μm and a length in the range of 5 to 1,000 μm.

23. A method according to claim 20, wherein after the drying an inorganic oxide sol is further applied to said carrier.

24. A method according to claim 20, wherein said carrier is further calcined.

25. A method for the production of a carrier for catalyst using refractory inorganic particles as cores and having a refractory inorganic powder and inorganic oxide sol deposited on the cores, which method comprises applying a mixed slurry of the refractory inorganic powder and the inorganic oxide sol to the refractory inorganic particles and drying the resultant wet refractory inorganic particles.

26. A method according to claim 25, wherein the amount of said refractory inorganic powder is in the range of 1 to 500 g, based on 100 ml of said refractory inorganic particles and the amount of said inorganic oxide sol is in the range of 0.5 to 20% by weight calculated as an oxide, based on the amount of said refractory inorganic powder.

27. A method according to claim 26, wherein said refractory inorganic particles possess particle diameters in the range of 0.3 to 12 mm and said refractory inorganic powder possesses an average particle diameter in the range of 0.05 to 1,200 μm.

28. A method according to claim 25, wherein said carrier is, further calcined.

29. A method for the production of a carrier for catalyst using refractory inorganic particles as cores and having a refractory inorganic powder, whiskers, and inorganic oxide so deposited on the cores, which method comprises applying a mixed slurry of the refractory inorganic powder, the whiskers, and the inorganic oxide sol to the refractory inorganic particles and drying the resultant wet refractory inorganic particles.

30. A method according to claim 29, wherein the amount of said refractory inorganic powder is in the range of 1 to 500 g, based on 100 ml of said refractory inorganic particles and the amount of said whiskers is in the range of 1 to 50% by weight and the amount of said inorganic oxide sol is in the range of 0.5 to 20% by weight calculated as an oxide, based on the amount of said refractory inorganic powder.

31. A method according to claim 30, wherein said refractory inorganic particles possess particle diameters in the range of 0.3 to 12 mm and said refractory inorganic powder possesses an average particle diameter in the range of 0.05 to 1,200 μm and said whiskers possess an average diameter in the range of 0.1 to 5 μm and a length in the range of 5 to 1,000 μm.

32. A method according to claim 29, wherein said carrier is further calcined.

33. A method for production of a carrier for catalyst according to any one of claims 20, 25, or 29, which comprises using a centrifugal flow coating device in the applying step.

* * * * *